(12) United States Patent
Kikukawa

(10) Patent No.: US 6,189,636 B1
(45) Date of Patent: Feb. 20, 2001

(54) BATTERY-POWERED INDUSTRIAL VEHICLE

(75) Inventor: Keiichi Kikukawa, Kariya (JP)

(73) Assignee: Kabushiki Kaisha Toyoda Jidishokki Seisakusho, Kariya (JP)

( * ) Notice: Under 35 U.S.C. 154(b), the term of this patent shall be extended for 0 days.

(21) Appl. No.: 09/244,325

(22) Filed: Feb. 3, 1999

(30) Foreign Application Priority Data

Feb. 6, 1998 (JP) .................................................. 10-026059

(51) Int. Cl.[7] .................................................. B60K 1/00
(52) U.S. Cl. ........................................ 180/68.5; 180/65.1
(58) Field of Search ........................... 180/65.1, 65.2, 180/65.5, 65.6, 65.7, 65.8, 68.5

(56) References Cited

U.S. PATENT DOCUMENTS 1,875,627   9/1932   Mancha et al. .
5,501,289   3/1996   Nishikawa et al. .

FOREIGN PATENT DOCUMENTS

| 0 030 928 A1 | 6/1981 | (EP) . |
| 2 705 903 | 12/1994 | (FR) . |
| 2097731 | 11/1982 | (GB) . |
| 48-80267 | 10/1973 | (JP) . |
| 4-317870 | 11/1992 | (JP) . |
| 2861503 | 12/1998 | (JP) . |

*Primary Examiner*—Richard M. Camby
(74) *Attorney, Agent, or Firm*—Morgan & Finnegan, L.L.P.

(57) ABSTRACT

A battery-powered forklift includes a body frame, which includes a battery box. The forklift includes a seat for a driver and a floor board located below the seat for supporting the feet of the driver. The battery box is located below the floor board. The floor board covers part of the battery box.

18 Claims, 7 Drawing Sheets

BATTERY-POWERED INDUSTRIAL VEHICLE

BACKGROUND OF THE INVENTION

The present invention relates to industrial vehicles such as forklifts having a battery, and more specifically, to a battery location.

Generally, battery-powered forklifts are divided into two types according to the location of the battery. As shown in FIGS. 7 and 8, in one type of forklift 60, which is mainly used in Japan, part of a battery 61 is located above the rear wheels 62. Parts of the steering mechanism (not shown) are located below the battery 61. A battery hood 63, which opens and closes, is located over the battery 61. A seat 64 is provided above the battery hood 63.

As shown in FIGS. 9 and 10, in a second type of forklift 60, which is mainly used in Europe, a battery 61 is located between the front wheels 65 and rear wheels 62. The lower part of the battery 61 extends to the vicinity of a vehicle frame 66. Accordingly, the size of the battery 61 of the European-type forklift 60 can be larger than that of the Japanese-type forklift 60. Further, the center of gravity of the European-type forklift 60 is lower, and the European-type forklift 60 is thus more stable than the Japanese-type forklift 60.

Compared to engine-powered forklifts, the battery-powered forklifts have less space in the driver's compartment, especially at the feet of the driver, because the battery 61 occupies a large space. Further, the battery 61, which is a rectangular parallelepiped, has substantially the same width as that of the vehicle body 66. The upper surface of the battery 61 reaches the vicinity of the seat 64. The battery hood 63 has a shape substantially corresponding to the shape of the battery 61. Therefore, compared to the engine-powered forklift, the driver has trouble getting in and out of the driver's compartment 67 due to the corner of the battery hood 63.

In the Japanese-type forklift 60, the driver's room is increased by positioning part of the battery 61 above the rear wheels 62. However, since the center of gravity of the Japanese-type forklift 60 is higher than that of the European-type forklift 60, the stability of the Japanese-type is lower.

On the other hand, the battery 61 of the European-type forklift 60 is located more forward than that of the Japanese-type forklift 60. Therefore, the driver's foot room in the European-type is smaller than that of the Japanese-type, and a step 68 is relatively small. When loading and unloading a truck using the forklift 60, the driver must frequently get in and out of the forklift 60. The narrow compartment 67 and the small step 68 inconvenience the driver, and work efficiency is lowered.

SUMMARY OF THE INVENTION

An objective of the present invention is to provide a stable battery-powered industrial vehicle that facilitates getting in and out of the vehicle.

To achieve the above embodiment, the present invention provides an industrial vehicle driven by a battery. The industrial vehicle includes a body frame having a battery box, a seat for a driver, and a floor for supporting the driver's feet. The floor is below the seat, the battery box is below the floor, and the floor covers part of the battery box.

The present invention also includes a forklift driven by a battery. The forklift includes a body frame having a battery box. The battery box has an opening that faces upward. The forklift further includes a hood for covering a rear portion of the opening, a seat for a driver, which is provided on the hood and a floor board for supporting the feet of a driver. The floor board is located below the seat, the battery box is located below the floor board, and the floor board covers a front portion of the opening.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
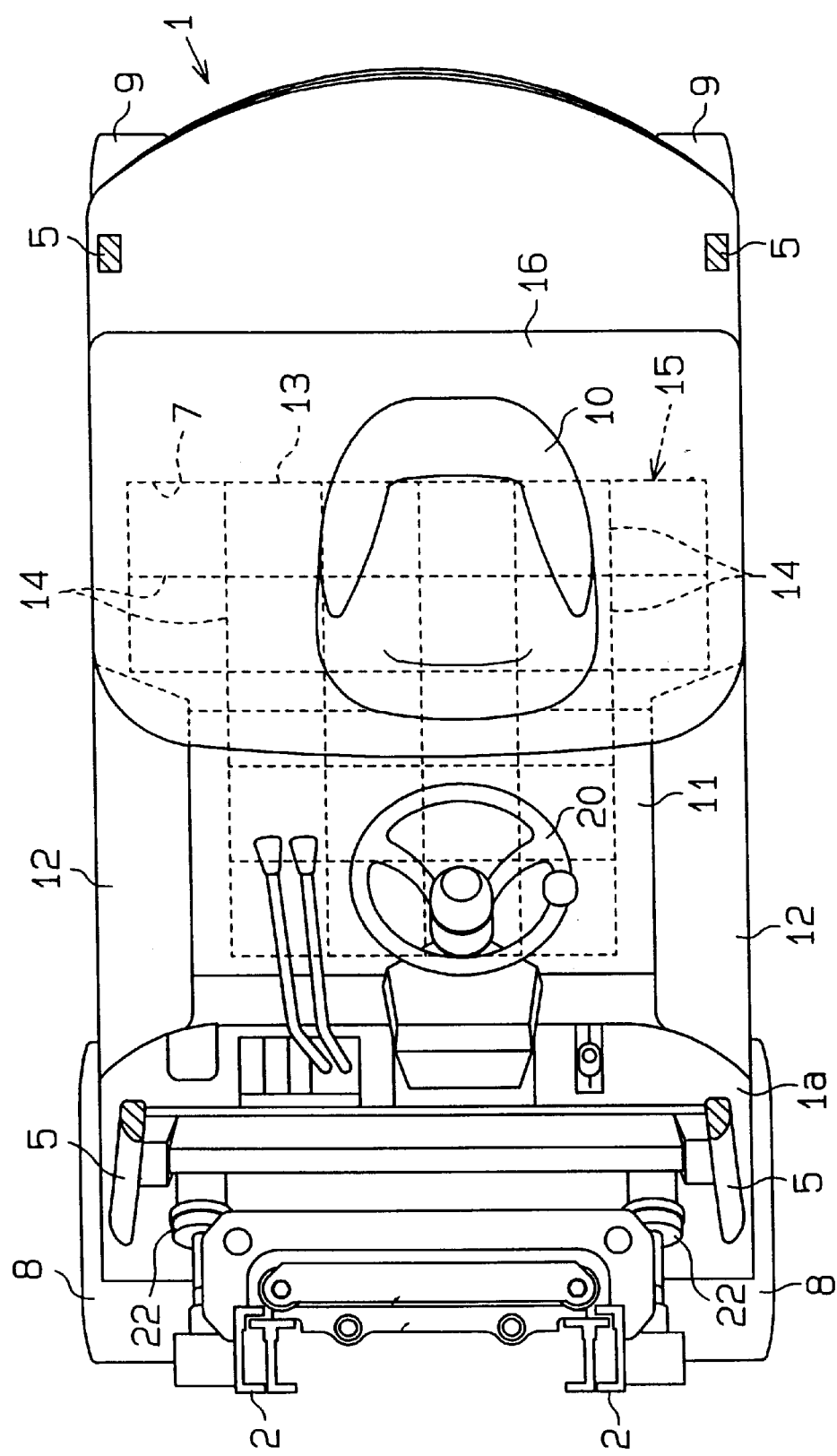
FIG. 1 is a plan view of a forklift according to a first embodiment of the present invention.

A first embodiment of the present invention will now be described in reference to FIGS. 1–4. As shown in FIGS. 1 and 3, a pair of masts 2 is attached to the front portion of a body frame 1a of a battery-type forklift 1. A fork 3 is slidably supported by the masts 2 through a lift bracket 3a. The fork 3 moves up and down with the lift bracket 3a along the masts 2 by the expansion and contraction of a lift cylinder 4. Four supports 5 are provided on the body frame 1a. A head-guard 5a is provided on the top end of the supports 5. A driver's compartment 6 is defined in the space surrounded by the supports 5 and the head-guard 5a.

A battery box 7 for accommodating a battery 15 is provided below the driver's compartment 6. The body frame 1a forms the battery box 7 between the front wheels 8 and the rear wheels 9. The battery box 7 is lower than the floor board 11 that supports the driver's legs. Further, the front end of the battery box extends forward to a position that corresponds to the front end of the floor board 11. The battery 15 in the battery box 7 has substantially the same volume as that in the forklift shown in FIGS. 7 and 8.

Figure 2:
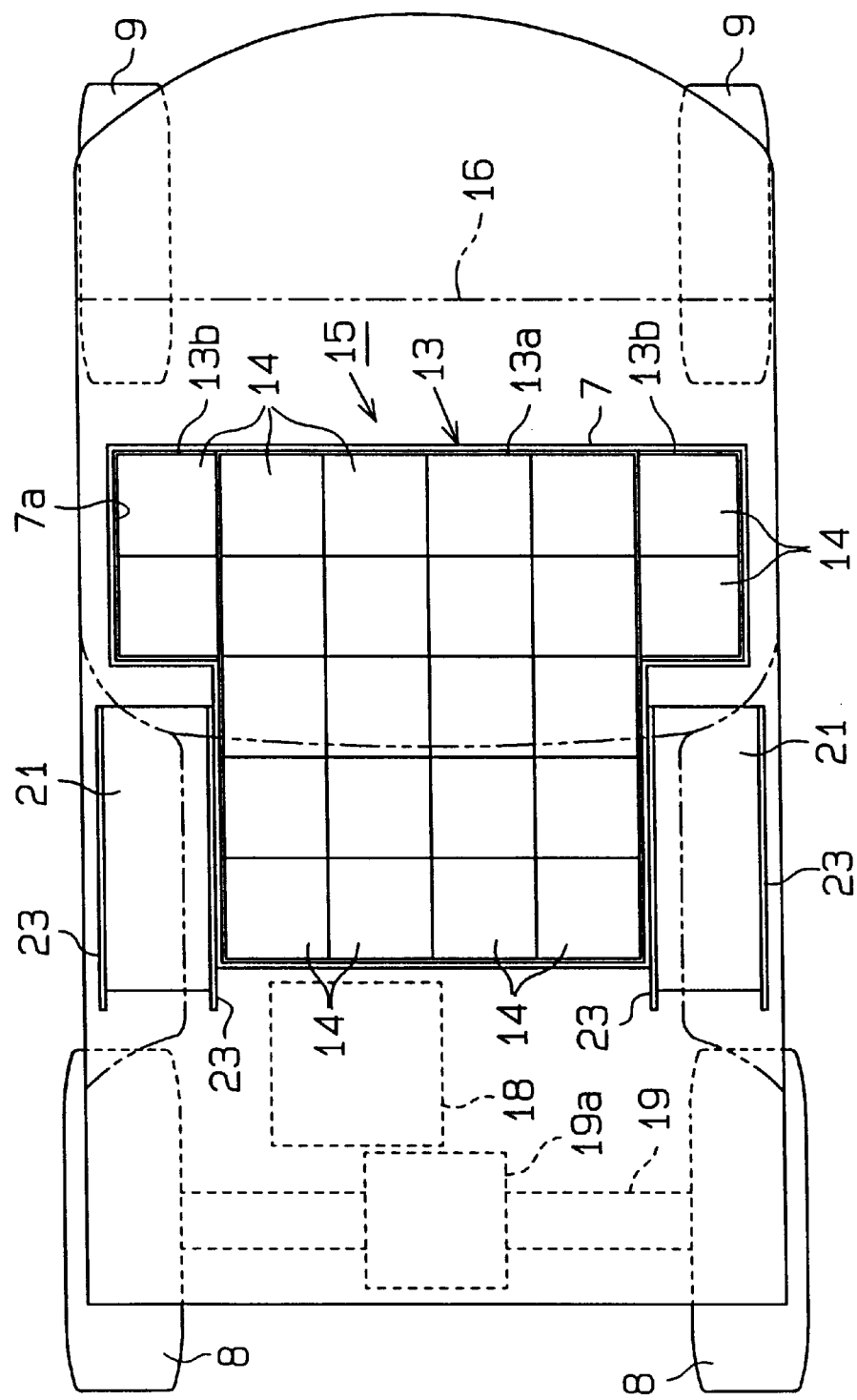
FIG. 2 is a schematic plan view showing the location of a battery in the forklift of FIG. 1.
Figure 3:
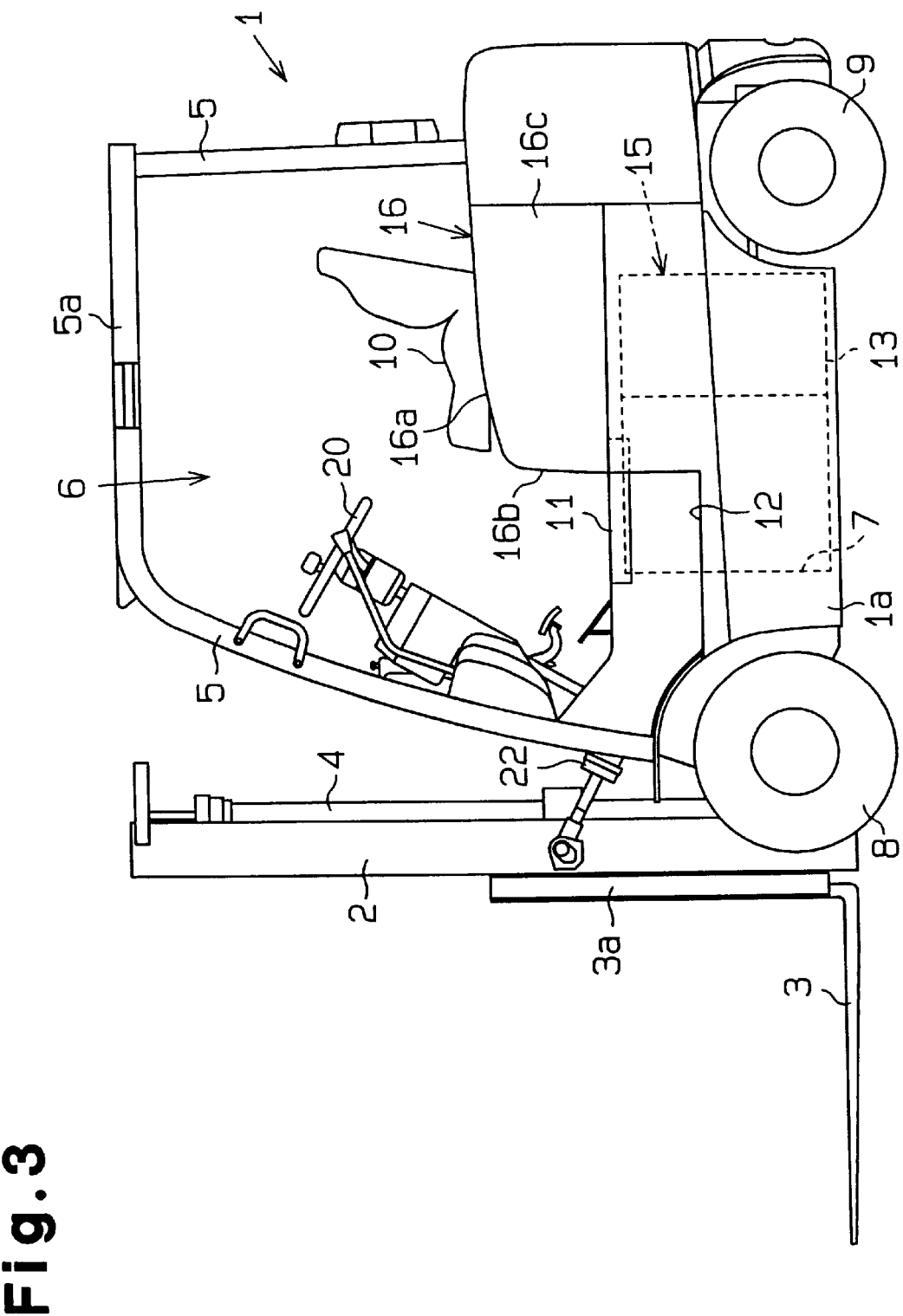
FIG. 3 is a side elevation of the forklift of FIG. 1.

As shown in FIG. 1 and 2, the battery box is symmetrical about a vertical longitudinal plane and is substantially T-shaped. The rear portion of the battery box 7 has substantially the same width as that of the body frame 1a, and the front portion of the battery box 7 has a narrower width than that of the rear portion. The longitudinal axis of the battery box 7 is preferably vertically aligned with that of the body frame 1a. The steps 12 are formed on the narrow portion of the battery box 7, that is, on the sides of the front portion. As shown in FIG. 3, the steps 12 are located below the floor board 11.

The battery 15 is made of a plurality of battery cells 14 held in a case 13. The battery 15 is a lead storage battery. The battery case 13 is formed to correspond to the shape of the box 7. The number of battery cells 14 varies in accordance with the amount of current and electric power required by the forklift 1. The number of battery cells 14 in the battery case 13 is enough to supply the necessary electric current and power. In the illustrated embodiment, twenty-four battery cells 14 are used. Each battery cell 14 produces two volts of electromotive force. Forty-eight volts are produced by serially connecting the battery cells 14. As shown in FIG. 2, the battery case 13 includes a main rectangular case 13a, which accommodates twenty battery cells, and a pair of sub cases 13b, each of which accommodates two battery cells 14. The sub cases 13b are welded to the sides of the main case 13a as shown in FIG. 2. The battery case also includes a lifting hole (not shown) for permitting a lifting cable (not shown) to be attached for lifting the battery 15. The lifting hole is located above the upper end of the battery box 7 since the upper end of the battery case 13 projects slightly higher than the upper end of the battery box 7.

A battery hood 16 covers the rear portion of an upper opening 7a of the battery box 7, and the front portion is covered by the floor board 11. The floor board 11 is detachably fixed to the body frame 1a by bolts or screws (not shown). When changing the battery 15, detaching the floor board 11 opens the upper opening 7a. As shown by the chain line in FIG. 4, both sides of the floor board 11 are bent downward.

Figure 4:
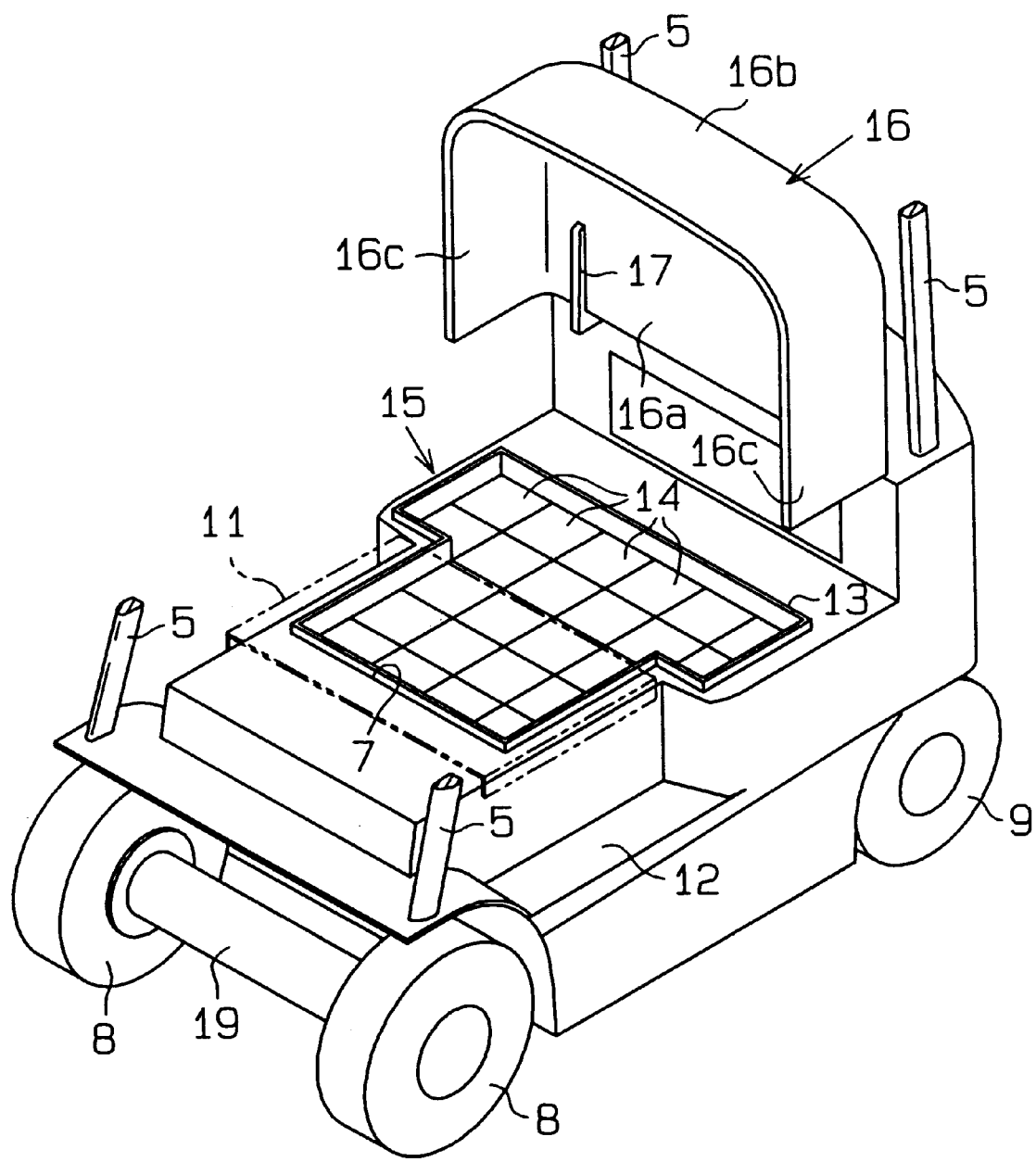
FIG. 4 is a perspective view of the forklift of FIG. 1 when a battery hood is opened.

The rear portion of the battery hood 16 is pivotally supported on the body frame 1a through a pair of hinges 17 (See FIG. 4). The battery hood 16 includes an upper wall 16a, which is horizontal when closed, a front wall 16b and a pair of side walls 16c, which are connected to the upper wall 16a. A seat 10 is secured on the upper wall 16a.

Figure 10:
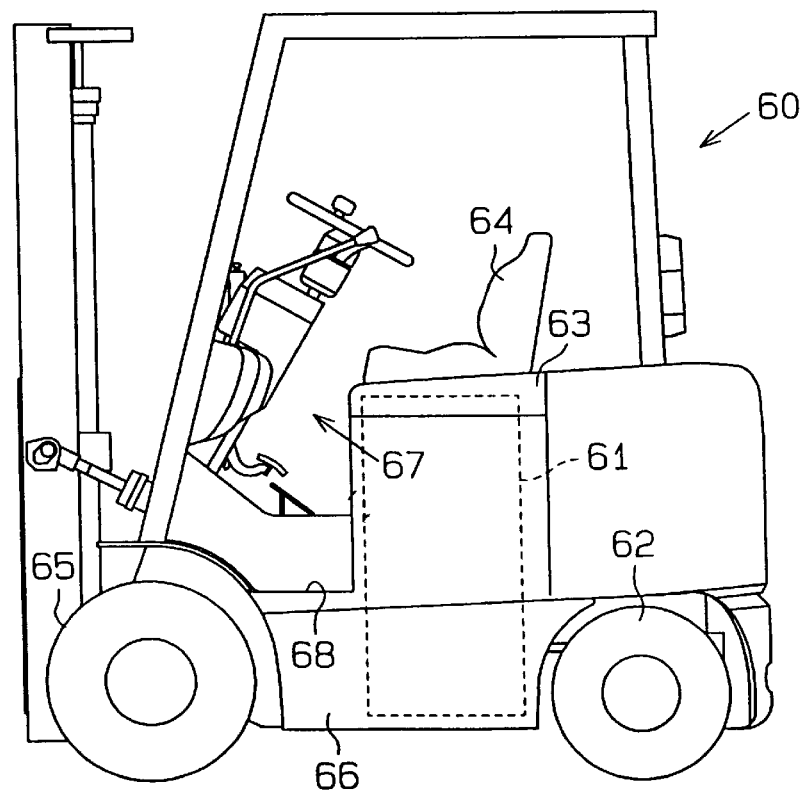
FIG. 10 is a side view of the forklift of FIG. 9.

The battery hood 16 covers the rear portion of the box 7. When the battery hood 16 is closed, the lower rim of the front wall 16b abuts on the upper surface of the floor board 11. Each of the front corners of the battery hood 16, which are virtually aligned with the rear of the steps 12, has a large radius of curvature. To make the height of the seat 10 substantially the same as that of the prior art seat 64 shown in FIGS. 8 and 10, the side walls 16c of the battery hood 16 extend higher than those of the prior art battery hood 63.

An engaging portion (not shown) is provided on one of the side walls 16c of the battery hood 16. The floor board 11 includes an engaging portion and an engageabe catch (not shown). When the battery hood 16 is closed, the engaging portion engages the catch. A damper (not shown) is provided between the inner side of the battery hood 16 and the body frame 1a. The damper permits the battery hood 16 to be opened and closed with a small force.

As shown in FIG. 2, a motor 18 for driving the front wheels 8 is provided in the front of the battery box 7. The motor 18 drives the front wheels 8 through a differential 19a and other gears (not shown). The rear wheels 9 are steered by a hydraulic power steering apparatus (not shown), which is provided behind the battery 15. Oil tanks 21, which are used for hydraulic operation of the forklift 1 and the power steering apparatus, are provided below the steps 12. Supporting members 23, which transfer the force applied by a hydraulic tilt cylinder 22 to the body frame 1a, are arranged to surround the oil tanks 21.

The operation of the illustrated forklift will now be described. Since the battery 15 is lower than the prior art battery 61 of the forklift 60 shown in FIG. 7 and 8, the center of gravity of the vehicle body is relatively low. Since the battery 15 is located more forward than that of the Japanese-type forklift 60, the stability of the vehicle body would be reduced if the height of the gravity center remained the same. However, the effect of lowering the center of gravity of the forklift 1 is greater than that of moving the gravity center forward. Therefore, the vehicle is more stable than the prior art models.

As shown in FIG. 3, the battery hood 16 is kept closed except when the battery 15 is replaced or checked. When taking out the battery 15, the catch is first released, and the battery hood 16 is released. Then, the damper (not shown) urges the battery hood 16 open, and the battery hood abuts against a rubber cushion (not shown) on the support 5. To prevent the battery hood 16 from closing inadvertently from external pressure, a known lock mechanism (not shown) locks the battery hood 16 at the open position. The lock mechanism locks the battery hood 16 when the battery hood 16 is fully opened. A driver releases the lock mechanism when closing the battery hood 16.

Subsequently, the floor board 11 covering the upper opening 7a is taken off and the upper opening 7a is fully opened. In this state, a lifting cable is hooked in the lifting hole of the battery case 13, and a crane lifts the battery case 13 from the battery box 7 with the cable. When the lower end of the battery case 13 is raised higher than the upper end of the battery box 7, the battery case 13 is moved laterally and is loaded on a carrier vehicle (not shown).

On the other hand, when installing a battery 15, a battery case 14 that contains charged battery cells 14 is placed in the battery box 7 in the reverse order of the battery removal. Then, after the floor board 11 is returned to its closed position, the battery hood 16 is pivoted to a closed position. Finally, the battery hood 16 is secured by engaging its catch.

The present invention has the following advantages.

(1) The battery box 7 is located below the floor board 11. This lowers the center of gravity of the vehicle in comparison with the prior art forklift 60 shown in FIGS. 7 and 8, in which the battery 61 is located above the rear wheels. Therefore, the forklift 1 of FIGS. 1–4 is relatively more stable.

(2) The floor board 11 covers part of the opening of the battery box 7. This permits the driver's foot room to be increased and facilitates getting in and out of the vehicle.

(3) The battery box 7 is located between the front wheels 8 and the rear wheels 9. Therefore, the position of the battery box 7 is easily lowered.

(4) The pair of steps 68 is formed to correspond to the narrow portion of the battery box 7. Therefore, the steps 12 are large and the driver can more easily get in and out of the vehicle.

(5) Generally, the driver gets in and out of the vehicle from the left side. In this embodiment, the steps 12 are formed on both sides of the vehicle. Therefore, a driver can get in and out of the vehicle on either side.

(6) The battery box 7 is symmetrical, and its longitudinal axis and that of the vehicle are vertically aligned. Therefore, the center of gravity of the battery 15 is vertically aligned with the longitudinal axis of the vehicle. If the center of gravity of the battery were to be off center, the forklift would be less stable.

(7) The front portion of the battery box 7 is narrow, and the rear portion is wide. This shifts the center of gravity of the battery 15 to the rear as compared to a regular rectangular battery box 7 with the same volume. Thus, the forklift 1 is more stable.

(8) The hydraulic oil tanks 21 are located below the steps 12. Since the steps 12 are located on both sides, the supporting members 23, which transfer force applied by the tilt cylinders 22 to the body frame 1a, can be located below the steps 12. Accordingly, manufacturing costs are lowered since the members for forming the body frame 1a can be thin without losing the required strength.

(9) The battery hood 16 covers part of the upper opening 7a of the battery box 7. Therefore, the battery hood 16 can be designed without matching the shape of the upper opening 7a. Accordingly, even if the battery box is rectangular, the shape of the battery hood does not have to be rectangular. Thus, the battery hood 16 may be creatively designed. Further, the battery hood 16 can be shared with other types of forklifts such as forklifts with different lifting capacities or engine-powered forklifts, which lowers costs.

(10) The corners of the battery hood 16 are curved with a large radius of curvature. Accordingly, the corners do not obstruct a driver when getting in and out of the vehicle.

(11) Since the side walls 16c of the battery hood 16 are high, the volume of the battery hood 16 is large. Accordingly, electrical components and auxiliary equipment are arranged inside the battery hood 16.

Figure 7:
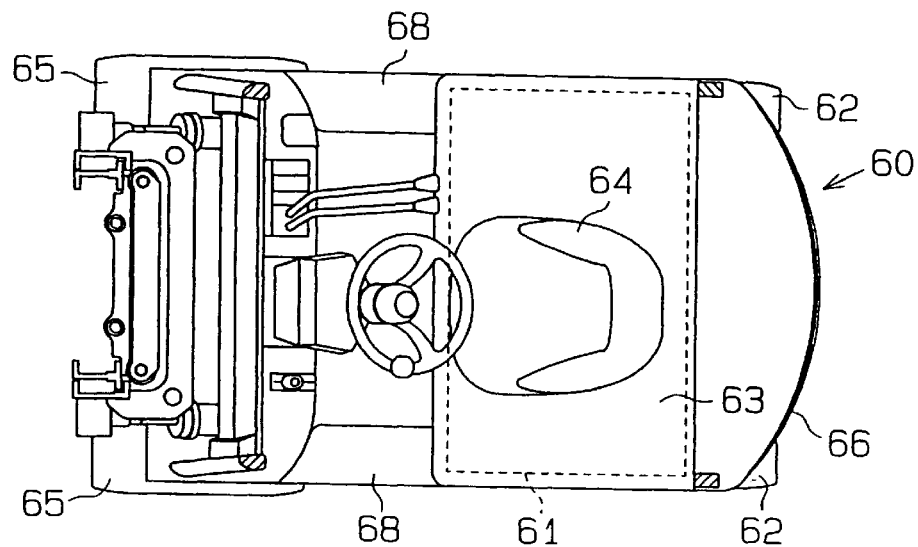
FIG. 7 is a plan view of a prior art forklift.
Figure 8:
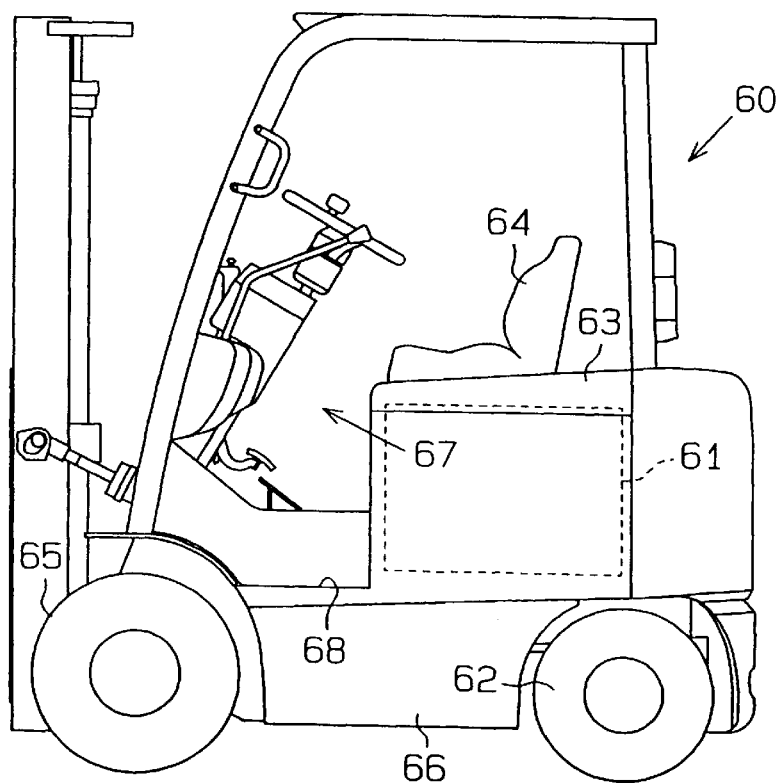
FIG. 8 is a side elevation of the forklift of FIG. 7.
Figure 9:
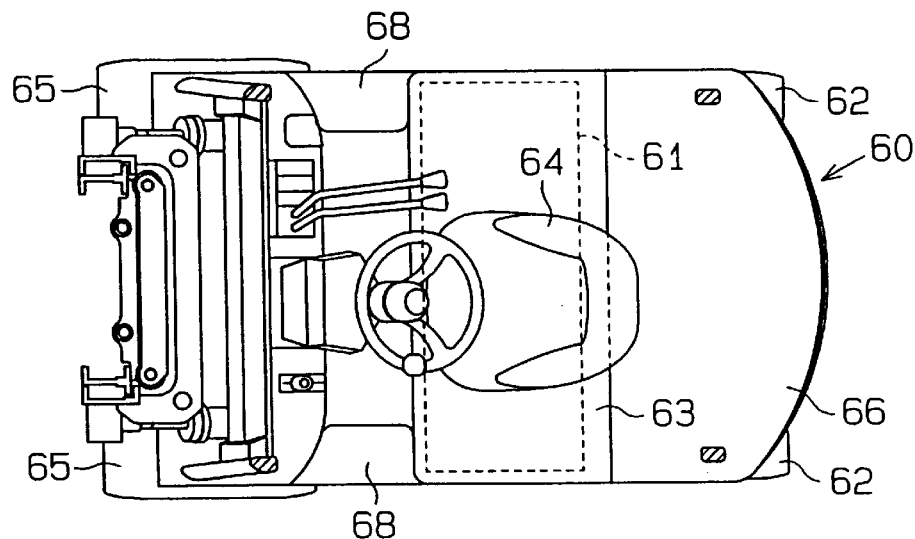
FIG. 9 is a plan view of another prior art forklift.

(12) The distance between the rear end of the battery box 7 and the rear support 5 is greater than that of the prior art forklift shown in FIGS. 7 and 8. Therefore, the battery hood 16 can be widely opened without interfering with the support 5.

(13) When the position of the battery 15 is low, the same battery hood can be used without changing its height by changing the height of the floor board 11. On the other hand, when the position of the battery 15 is high, drastic change of layout is unnecessary since the height of the floor board 11 can be decreased.

The present invention is not limited to the above embodiment, but further be embodied as follows.

Figure 5:
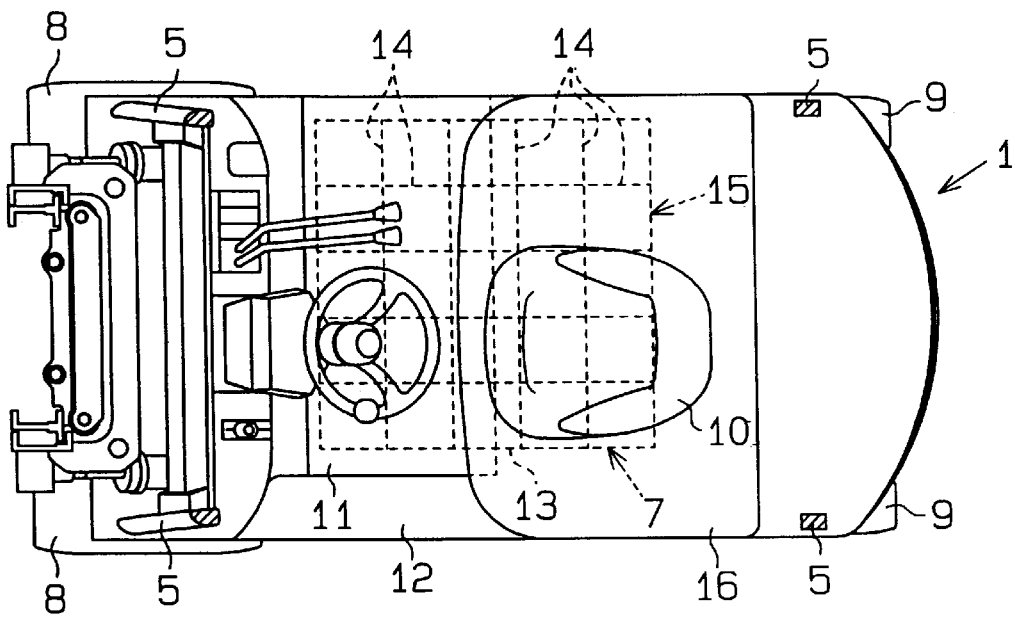
FIG. 5 is a plan view of a forklift according to a second embodiment of the present invention.

As shown in FIG. 5, a battery box 7, which is narrower than the vehicle and regular in shape, may be offset to one side (the right side in this embodiment). In this case, a step 12 is formed on one side of the vehicle (the left side in this embodiment). Five battery cells 14 can be arranged widthwise and five cells 14 can be arranged lengthwise in the battery case 13, thus the battery case 13 can accommodate twenty-five battery cells in total. However, since only twenty-four battery cells are necessary, a space corresponding to the size of one battery cell is formed at a corner of the battery case 13. The shape and position of the step 12 and the structure of the battery hood 16 are the same as those of the first embodiment. The hydraulic oil tank is located below the step 12 and leftward of the battery box 7.

The embodiment of FIG. 5 has the advantages (1)–(4) and (9)–(13) of the first embodiment. In the embodiment of FIG. 5, the battery box 7 is square. Accordingly, the battery case 13 is formed with one box, and this facilitates the manufacturing of the battery case 13. Also, it is easier to balance the battery case when raising it, in comparison to the first embodiment. Further, the space on the left side of the battery box 7 and the corner space in the battery box 7 can be used for other purposes.

Figure 6:
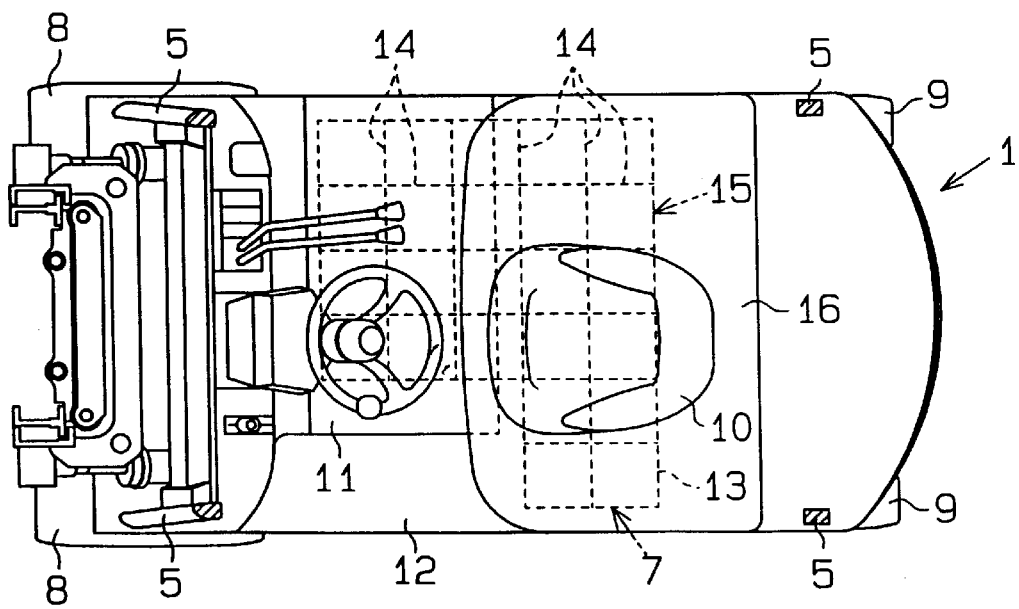
FIG. 6 is a plan view of a forklift according to a third embodiment of the present invention.

As shown in FIG. 6, the width of the rear portion of the battery box 7 may be substantially the same as that of the vehicle, and a step 12 may be formed on one side (left side in FIG. 6) of the front portion. In this case, the width of the step 12 can be increased.

The upper edge of the battery box 7 may be located at the same height as that of the step 12, and the battery case 13 may extend above the battery box 7 to a point just below the lower surface of the floor board 11. In this embodiment, the upper portion of the battery case 13 is covered with the floor board 11 and the battery hood 16, and part of the side surface of the battery case 13 is exposed on both sides of the forklift 1. In this embodiment, when taking out the battery 15 from the battery box 7, the battery case 13 needs only to be raised a little higher than the upper surface of the step 12 before being moved laterally. Accordingly, the battery 15 does not interfere with the steering column and equipment in the driver's compartment 6 such as an instrument panel. This facilitates battery replacement.

When the step 12 is formed on only one side of the forklift 1 as shown in FIGS. 5 and 6, the height of the upper edge of the battery box 7 may be lower than that of the step 12. In this case, when taking out the battery case 13, the battery case is less likely to interfere with the equipment in the driver's compartment since the battery case 13 does not need to be lifted very high before it is removed.

To avoid an unattractive appearance due to exposing part of the battery 15, a detachable side panel may be provided on the side of the forklift 1 to cover the side surface of the battery 15. In this case, the side panel is taken off when replacing the battery 15. The side panel may be constructed such that it can open and close, and the battery 15 is replaced when the side panel is opened.

The floor board 11 may be structured to open and close on hinges. The hinges may be provided either on the body frame 1a or on the battery hood 16. In this case, there is no need to use bolts or screws to secure the floor board.

The battery case 13 may be replaced by several cases, or preferably, two cases. For example, each of the battery cases 13 shown in FIGS. 2 and 6 may be replaced by two types of cases. One case accommodates battery cells 14 in a two-by-six arrangement, and the other accommodates battery cells 14 in a three-by-four arrangement. Or, the battery case 13 of FIG. 5 may be replaced by a case that accommodates battery cells 14 in a three-by-five arrangement and a case that accommodates battery cells 14 in a two-by-five arrangement. When replacing the battery 15, the rear battery case is taken out first, and then the front battery case is taken out. When taking out the front battery case, the case is first moved backward, then, the case is lifted and moved laterally. Battery installation is done in the reverse order. In this way, battery replacement is less likely to interfere with the equipment in the driver's compartment.

The hydraulic oil tank 21 may be formed by the body frame 1a and the supporting members 23. In this case, it is not necessary to install a hydraulic oil tank between the body frame 1a and the supporting members 23.

The supporting members 23 can be omitted if the body frame 1a is strengthened.

The location of the engaging portion and the catch for retaining the battery hood 16 in a closed position may be varied. For example, the engaging portion may be provided on the front wall 16b of the battery hood 16, and the catch may be provided at a position corresponding to the engaging portion. The retaining mechanism may be other known types of fasteners. Also, engaging portions may be provided at several positions. further, the battery hood 16 may be retained in a closed position by its weight without any retaining mechanism.

The damper for reducing the force needed for opening and closing the battery hood 16 may be omitted, and a retaining mechanism that retains the battery hood 16 in an open position may be provided.

When only a small number of battery cells 14 are required, for example, when the current requirements are low, the battery box 7 may have a uniform width that is the same as the narrow portion between the steps 12. In this case also, the stability of the vehicle is improved and getting in and out of the vehicle is facilitated.

The direction of movement of the battery hood may be vertical or horizontal.

The battery 15 is not limited to a lead storage battery. The battery 15 may be other types of batteries, such as a sodium-sulfur battery or a zinc-bromine battery.

Therefore, the present examples and embodiments are to be considered as illustrative and not restrictive and the invention is not to be limited to the details given herein, but may be modified within the scope and equivalence of the appended claims.

What is claimed is:

1. An industrial vehicle driven by a battery, the industrial vehicle comprising:
   a body frame having a battery box;
   a seat for a driver; and
   a floor for supporting the driver's feet, wherein the floor is below the seat, the battery box is below the floor, and the floor covers part of the battery box;
   wherein the battery box has a narrow portion which is narrower than the body frame, the narrow portion of the battery box being located at the front of the battery box, and the battery box includes a rear portion having substantially the same width as the width of the body frame.

2. An industrial vehicle driven by a battery, the industrial vehicle comprising:
   a body frame having a battery box;
   a seat for a driver; and
   a floor for supporting the driver's feet, wherein the floor is below the seat, the battery box is below the floor, and the floor covers part of the battery box;
   wherein the battery box has a narrow portion which is narrower than the body frame and the body frame has a step adjacent to a side of the narrow portion below the floor.

3. The industrial vehicle according to claim 2, wherein the floor covers the narrow portion.

4. The industrial vehicle according to claim 2, wherein the body frame has a step adjacent each side of the narrow portion, and each step is located below the floor.

5. The industrial vehicle according to claim 4, wherein the battery box is symmetrical with respect to a vertical plane that includes the longitudinal axis of the body frame.

6. The industrial vehicle according to claim 2, wherein the narrow portion of the battery box is located at the front of the battery box and the battery box includes a rear portion having substantially the same width as the width of the body frame.

7. The industrial vehicle according to claim 2, wherein the battery box is narrower than the body frame, the battery box is located closer to one side of the body frame, and the step, which is below the floor, is located between the opposite side of the body frame and the battery box.

8. The industrial vehicle according to claim 2 further comprising front and rear wheels, wherein the battery box is located between the front wheels and the rear wheels.

9. The industrial vehicle according to claim 1 further comprising a hood covering a rear portion of the box, wherein the floor covers a front portion of the box.

10. The industrial vehicle according to claim 9, wherein the hood and the floor are movable to open the box.

11. The industrial vehicle according to claim 9, wherein an upper surface of the hood is higher than an upper surface of the floor, and the seat is located on the upper surface of the hood.

12. The industrial vehicle according to claim 11, wherein the hood has a corner with a large-radius curved surface.

13. A forklift driven by a battery, the forklift comprising:
    a body frame having a battery box, wherein the battery box has an opening that faces upward;
    a hood covering a rear portion of the opening;
    a seat for a driver, the seat being on the hood;
    a floor board for supporting the feet of a driver, the floor board being located below the seat, wherein the battery box is located below the floor board, and the floor board covers a front portion of the opening.

14. The forklift according to claim 13, wherein a rear portion of the battery box has substantially the same width as the width of the body frame, a front portion of the battery box is narrower than the body frame, the body frame has a step located on each side of the front portion, and each step is lower than the floor board.

15. The forklift according to claim 14, wherein the battery box is symmetrical with respect to a vertical plane that includes the longitudinal axis of the body frame.

16. The forklift according to claim 13, further comprising front wheels and rear wheels wherein the battery box is located between the front wheels and the rear wheels.

17. The forklift according to claim 13, wherein the hood is supported by the body frame so that the hood can open and close the battery box, and the floor board is readily detachable from the body frame.

18. The forklift according to claim 13, wherein the hood has a corner with a large-radius curved surface.

\* \* \* \* \*

UNITED STATES PATENT AND TRADEMARK OFFICE
CERTIFICATE OF CORRECTION

PATENT NO. : 6,189,636 B1
DATED : February 20, 2001
INVENTOR(S) : Keiichi Kikukawa It is certified that error appears in the above-identified patent and that said Letters Patent is hereby corrected as shown below:

Column 3,
Line 48, please change "engageabe" to -- engageable --;

Column 6,
Line 57, please change "further" to -- Further --;

Column 7,
Line 36, after "portion" please insert -- , --;

Column 8,
Line 41, after "wheels" please insert -- , --;

Signed and Sealed this

Fourth Day of June, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,189,636 B1
DATED : February 20, 2001
INVENTOR(S) : Keiichi Kikukawa It is certified that error appears in the above-identified patent and that said Letters Patent is hereby corrected as shown below:

<u>Title page,</u>
Item [73], Assignee, please change, "Kabushiki Kaisha Toyoda Jidishokki Seisakusho, Kariya (JP)" to -- Kabushiki Kaisha Toyoda Jidoshokki Seisakusho, Kariya (JP) --.

Signed and Sealed this

Twentieth Day of August, 2002

Attest:

Attesting Officer

JAMES E. ROGAN
*Director of the United States Patent and Trademark Office*